US008259604B2

(12) United States Patent
Lincoln et al.

(10) Patent No.: US 8,259,604 B2
(45) Date of Patent: Sep. 4, 2012

(54) RETURN LINK POWER CONTROL

(75) Inventors: Andy Lincoln, San Diego, CA (US); Fan Mo, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 464 days.

(21) Appl. No.: 12/472,922

(22) Filed: May 27, 2009

(65) Prior Publication Data

US 2009/0296629 A1 Dec. 3, 2009

Related U.S. Application Data

(60) Provisional application No. 61/056,425, filed on May 27, 2008, provisional application No. 61/056,772, filed on May 28, 2008.

(51) Int. Cl.
*H04J 3/14* (2006.01)
*H04B 7/212* (2006.01)

(52) U.S. Cl. ......... 370/252; 370/337; 370/347; 370/465

(58) Field of Classification Search ........................ None
See application file for complete search history.

(56) References Cited

U.S. PATENT DOCUMENTS

| | | | |
|---|---|---|---|
| 4,418,425 A | 11/1983 | Fennel, Jr. et al. | |
| 5,243,653 A | 9/1993 | Malek et al. | |
| 5,644,602 A | 7/1997 | Critchlow et al. | |
| 5,987,139 A | 11/1999 | Bodin | |
| 6,813,355 B1 | 11/2004 | Hakaste | |
| 7,062,287 B2 | 6/2006 | Nakamura et al. | |
| 7,215,650 B1 * | 5/2007 | Miller et al. | 370/315 |
| 7,242,945 B2 * | 7/2007 | Reddi | 455/446 |
| 7,656,813 B2 * | 2/2010 | Kloper | 370/252 |
| 7,657,748 B2 | 2/2010 | Gentry | |
| 7,899,183 B2 | 3/2011 | Tajima et al. | |
| 7,916,680 B2 * | 3/2011 | Miller et al. | 370/315 |

| | | | |
|---|---|---|---|
| 2002/0037705 A1 * | 3/2002 | Moerder et al. | 455/115 |
| 2002/0075827 A1 | 6/2002 | Balogh et al. | |
| 2002/0174242 A1 | 11/2002 | Hindie et al. | |

(Continued)

FOREIGN PATENT DOCUMENTS

JP 61-113326 A 5/1986
(Continued)

OTHER PUBLICATIONS

PCT International Search Report and Written Opinion mailed Oct. 11, 2010; International Application No. PCT/US2009/045349; 9 pages.
Burg, A., et al., "FPGA Implementation of a MIMO Receiver Front-End for the UMTS Downlink", Proc. International Zurich Seminar on Broadband Communications Access, Feb. 19-21, 2002 Zurich, Switzerland, pp. 8-1-8-6.

(Continued)

*Primary Examiner* — Andrew Lee
(74) *Attorney, Agent, or Firm* — Kilpatrick Townsend & Stockton LLP

(57) ABSTRACT

Satellite communication methods and systems are disclosed. Various embodiments employ dummy bursts to monitor the communication channel between a user terminal and a hub. In some embodiments, dynamic link adaptation can also be employed to optimize channel performance. In some embodiments, the link margin can be estimated based on the signal quality of a traffic or dummy burst that is received at the hub and compared with a threshold value. If the link margin is less than a first/low threshold then the hub can instruct the terminal to change any of various communication parameters according to a predetermined algorithm to mitigate channel fading. If the link margin is greater than a second/high threshold then the hub can instruct the terminal to change any of various communication parameters according to a predetermined algorithm to reduce overcompensation for channel fading.

38 Claims, 8 Drawing Sheets

U.S. PATENT DOCUMENTS

| | | | |
|---|---|---|---|
| 2003/0112878 A1* | 6/2003 | Kloper | 375/259 |
| 2003/0128711 A1* | 7/2003 | Olariu et al. | 370/401 |
| 2004/0120349 A1* | 6/2004 | Border et al. | 370/474 |
| 2005/0172129 A1 | 8/2005 | Tajima et al. | |
| 2006/0101116 A1* | 5/2006 | Rittman et al. | 709/204 |
| 2006/0177065 A1 | 8/2006 | Halbert | |
| 2007/0155388 A1* | 7/2007 | Petrovic et al. | 455/442 |
| 2007/0189230 A1 | 8/2007 | Lee | |
| 2007/0276955 A1* | 11/2007 | Edsberg | 709/237 |
| 2008/0008264 A1* | 1/2008 | Zheng | 375/299 |
| 2009/0296629 A1 | 12/2009 | Lincoln et al. | |
| 2009/0296847 A1 | 12/2009 | Lee | |
| 2009/0323952 A1 | 12/2009 | Smith | |

FOREIGN PATENT DOCUMENTS

| | | |
|---|---|---|
| KR | 10-2004-0043731 A | 5/2004 |

OTHER PUBLICATIONS

Almeida, Carlos Beltran et al., "Testability Issues in the CMS ECAL Upper-level Readout and Trigger System", Proc. of the 5th Workshop on Electronics for LHC Experiments, Oct. 29, 1999, 7 pgs.

PCT International Search Report and Written Opinion mailed Jan. 29, 2009; International Application No. PCT/US2009/045345, 11 pages.

PCT International Search Report and Written Opinion mailed Dec. 29, 2009; International Application No. PCT/US2009/045343, 11 pages.

Non Final Office Action of U.S. Appl. No. 12/473,104, mailed Aug. 18, 2011.

* cited by examiner

RETURN LINK POWER CONTROL

CROSS-REFERENCES TO RELATED APPLICATIONS

This application claims the benefit of commonly assigned U.S. Provisional Patent Application No. 61/056,425, filed May 27, 2008, entitled "Return Link Power Control and Fault Tolerant Modem Redundancy," and this application claims the benefit of commonly assigned U.S. Provisional Patent Application No. 61/056,772, filed May 28, 2008, entitled "Time of Day Encryption Using TDMA Timing," the disclosures of which are herein incorporated by reference for all purposes.

BACKGROUND

Satellite communication systems have become ubiquitous. They are used for various purposes including home entertainment, military applications, real time financial transactions, radio, and mobile Internet to name a few. As satellite systems advance, the size of user terminals are becoming smaller and smaller. Moreover, the number of user terminals within a system are increasing. Various access and/or modulation techniques are being used within satellite systems to allow multiple users communicate with a hub at the same time.

BRIEF SUMMARY

Embodiments of the invention can provide for dynamic link adaptation and power control in a communication network. For example, the hub can adaptively adjust the power levels of the terminal to maintain a link margin within a threshold range. If, after a power correction, a communication channel is suffering from the effects of fading or is over powered, then the hub can send a request to the terminal to adjust the symbol rate, modulation and/or code rate at the terminal. Such embodiments can be provided in a satellite communication system.

Embodiments of the invention provide for a system and methods that utilize dummy bursts in addition to traffic or sync bursts for Link Margin analysis to combat the effects of channel fading. In some embodiments, a hub (or gateway) can assign timeslots for quiet terminals with no traffic data to send and/or request dummy bursts from terminals. Dummy bursts can be scheduled for each required terminal in free timeslots, for example, in a time division multiple access (TDMA) system. Moreover, in some embodiments, a hub can assign time slots for dummy bursts to terminals, which already have traffic bursts assigned. These terminals can use these time slots to carry queued or newly arrived data packets to support the system user. In some embodiments, each terminal can also communicate on one or more different frequency bands employing multiple-frequency TDMA (MFTDMA).

A burst time plan can be sent from the hub to the terminals. A burst time plan can include information specifying communication parameters such as, for example, the carrier frequency, the symbol rate, the modulation rate, the code rate, the burst size, and/or the timeslot within which bursts should be transmitted in. If data is not queued at the terminal for transmission, than a dummy burst can be sent using the communication parameters specified in the burst time plan. The hub can receive a dummy burst and estimate the link margin (LM) of the channel based on the received dummy burst and determine if the LM is within a low threshold value and/or within a high threshold value centered around a targeted LM. If the LM is outside of the threshold range, then the hub can request that the terminal should change some communication parameter such as, for example, the carrier frequency, the symbol rate, the modulation rate, the code rate, the burst size, and/or the timeslot. Such changes can be communicated to one or more terminals within another burst time plan or other control messages.

In some embodiments, multiple dummy bursts can be sent from a terminal while the LM is continuously estimated at the hub. The dummy bursts can include, for example, terminal status information, random data, coded data, and/or portions of queued data. In some embodiments, a dummy burst can be shorter than a TDMA timeslot or the length of a data burst. In other embodiments, a dummy burst can have a length the same as a TDMA timeslot or the length of a data burst.

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

Figure 1:
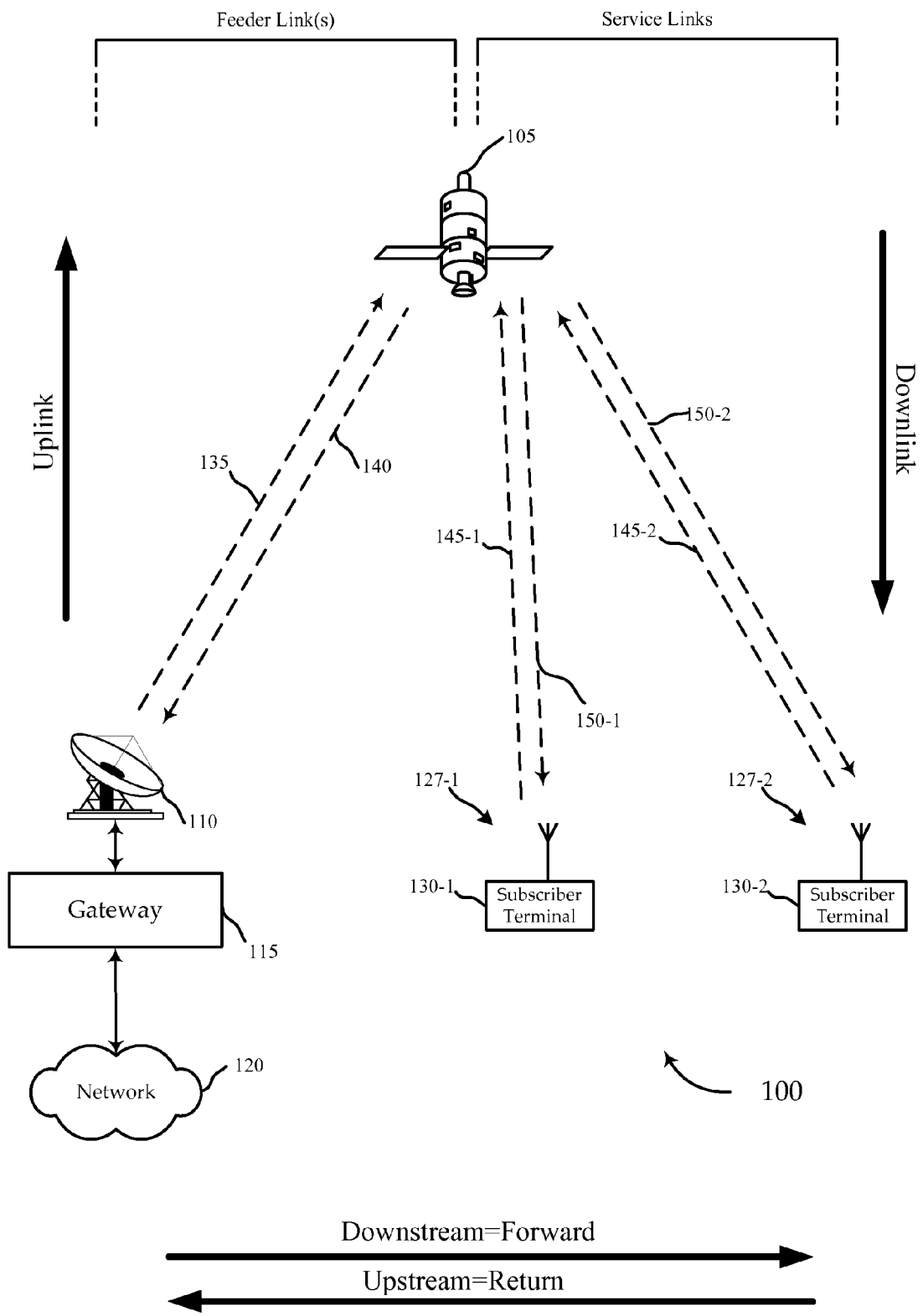
FIG. 1 shows a satellite communication system according to some embodiments.

The following detailed description, together with the accompanying drawings, will provide a better understanding of the nature and advantage of the embodiments disclosed herein.

DETAILED DESCRIPTION

Introduction

Fading can be a problem in communication systems (e.g., satellite communication systems) that can occur due to various atmospheric conditions such as precipitation and/or clouds. Fading can also be caused by multipath propagation and/or shadowing from obstacles. Fading can reduce the performance of the satellite communication system because it can result in a loss of signal power without a simultaneous reduction in the power of the noise. In some embodiments, cases of signal loss can occur over some or all of the signal bandwidth. Fading can also be a problem as it can change over time and/or geography. Moreover, some causes of fading may have a greater effect at different carrier frequencies.

Embodiments of the present invention can be used to mitigate the adverse effect of channel fading in a communication system by employing dynamic link adaptation (DLA) and/or with power control. In some embodiments, DLA can be implemented to adapt symbol rates and/or modulation and code rates in conjunction with power adaptation. DLA and power control are usually operated based on the link margin information estimated from dummy bursts in addition to traffic and sync bursts. In other embodiments of the invention, a combined system using both DLA and dummy bursts is provided to adapt quiet links (or channels) using DLA. Dummy bursts are supported by existing fielded systems, generally for the purpose of increasing data throughput for active terminals. For IP-based systems, dummy bursts optimized for data throughput can be allocated to active terminals in order to mitigate the effects of application startup issues and to provide extra "free" bandwidth to active terminals. Providing dummy bursts to quiet terminals has generally been considered a waste of system bandwidth because the terminals will likely not have real data to send. The typical use of dummy bursts for active terminal data throughput is appropriate for C- and Ku-band satellite systems which are relatively immune to rain fading compared to Ka-band systems. The present invention uses dummy bursts to improve the link adaptation performance and availability of quiet terminals compared to existing systems. Whatever the fade profiles and/or band of the communication system (whether terrestrial or satellite) dummy bursts can be utilized to allow close adaptation to the channel condition without traffic data, which can lead to improvements in system efficiency.

The present disclosure will discuss various embodiments of the invention. First a description of a satellite network that can employ other embodiments of the invention will be disclosed. Second, the use of dummy bursts in a communication system will be described using various embodiments and examples. Third, embodiments of dynamic link adaptation schemes will be disclosed.

Satellite Networks

Embodiments of the invention employing DLA and/or dummy burst can be particularly useful for communication in a satellite network. FIG. 1 shows satellite system 100 that is an example of a satellite system that can implement various embodiments of the invention. As shown, gateway 115 can communicate with various subscriber terminals 130 through satellite 105. In this embodiment, gateway 115 is coupled with communication network 120, for example, the Internet. In some embodiments, communication network 120 can include a private computer network, a computer system, and/or servers. Gateway 115 can use a satellite dish 110 (e.g., an antenna and/or a parabolic antenna) to bi-directionally communicate with a satellite 105 on a feeder link. An upstream forward link 135 communicates information from the gateway 115 to satellite 105, and downstream return link 140 communicates information from satellite 105 to gateway 115. Although not shown, there may be a number of gateways 115 in system 100. In some embodiments, gateway 115 can also include one or more computer processing systems including, for example, a processor, controller, memory, network interfaces, etc. In some embodiments, gateway 115 can include the computational system shown in FIG. 3.

Satellite 105 could perform switching or be a bent-pipe. Information can bi-directionally pass through the satellite 105. Satellite 105 could use antennas or phased arrays when communicating. The communication could be focused into spot beams or more broadly cover a bigger geographical area, for example, the entire continental US (CONUS).

Subscriber terminal 130 in this example can be bi-directionally coupled with satellite 105 and can provide connectivity with network 120 through gateway 115. Subscriber terminal 130 can receive information with forward downlink 150 from satellite 105, and transmit information is sent on a number of return uplinks 145. Subscriber terminal 130 can initiate return uplink 145 to send information upstream to satellite 105 and ultimately the gateway 115.

Communication channels such as downstream downlink 150, upstream uplink 145, downstream return link 140, and/or downstream uplink 135, can include Ka band, Ku band, X band and/or C band.

Multiple subscriber terminals 130 can communicate with gateway 115 using various time multiplexing techniques. For example, TDMA, dynamic TDMA, multi-frequency time division multiple access (MFTDMA), ALOHA, dynamic TDMA, etc. Moreover, various encryption and/or multiplexing techniques can be used in conjunction with time division multiplexing techniques.

Some embodiments of the invention can be used to mitigate the effects of channel fading in communication systems employing TDMA methods. TDMA is a channel access method for shared medium networks, such as satellite system 100 shown in FIG. 1. TDMA can allow several users to share the same channel by dividing the signal into different timeslots.

Dummy Bursts

In some embodiments, a dummy burst can have a length that is less than and/or equal to the length of the timeslot within which the dummy burst is transmitted. In some embodiments, a dummy burst can have a length that is less than and/or equal to the burst length of data bursts used within the network.

In some embodiments, a hub can assign a timeslot to a quiet terminal and the quiet terminal can send a dummy bursts within the assigned timeslot. Quiet terminals can be assigned one or more timeslots and/or one or more carrier frequencies using, for example, a burst time plan or other control message from the hub. Moreover, the burst time plan can also include information specifying the carrier frequency, the symbol rate, the modulation rate, the code rate, the burst size, and/or the timeslot. The burst time plan can be communicated to the terminals, and the terminals can send a dummy burst using the communication parameters assigned by the burst time plan. In some embodiments, the terminal can decide whether to send the dummy burst or not.

At the hub, a burst (e.g., dummy, sync, or traffic burst) can be received and the link margin (LM) can be estimated. The link margin can be estimated by subtracting the typical $E_s/N_o$ (energy per symbol per noise power spectral density) from the estimated $E_s/N_o$ of the received dummy burst. The LM can also be estimated using some other methods. For example, link margin can be estimated by calculating the delta between the received signal power and the expected signal power. As another example, the link margin can be estimated based on the receiver estimated channel BER (usually estimated and reported by the decoder) and comparing it to the expected channel BER. If the estimated LM is below a low threshold value, then the hub can specify that the terminal adjust one or more communication parameters, for example, to increase the terminal transmission power, to lower the symbol rate or the code rate, to move to more robust modulation schemes, and/or to improve the transmission reliability to combat the effects of fading. If the LM is above a high threshold value, then the hub can specify that the terminal adjust one or more communication parameters, for example, to reduce the transmission power, to increase the symbol rate or code rate, and/or to move to higher order modulation to improve the transmission efficiency. These communication parameters can include the transmission power, the forward error correction rate, the code modulation scheme, the modulation rate, the symbol rate and/or the carrier frequency. Changes to communication parameters can be communicated within another burst time plan along with an assigned timeslot for another dummy burst or for queued data, or through other control messages. The terminal can make the changes as specified by the hub and communicate accordingly. In some embodiments, the hub can simply pass on the estimated LM and the terminal can adjust the parameters. Multiple iterations of dummy bursts and LM estimation can be used to modify the communication parameters to ensure efficient communication.

Figure 2:
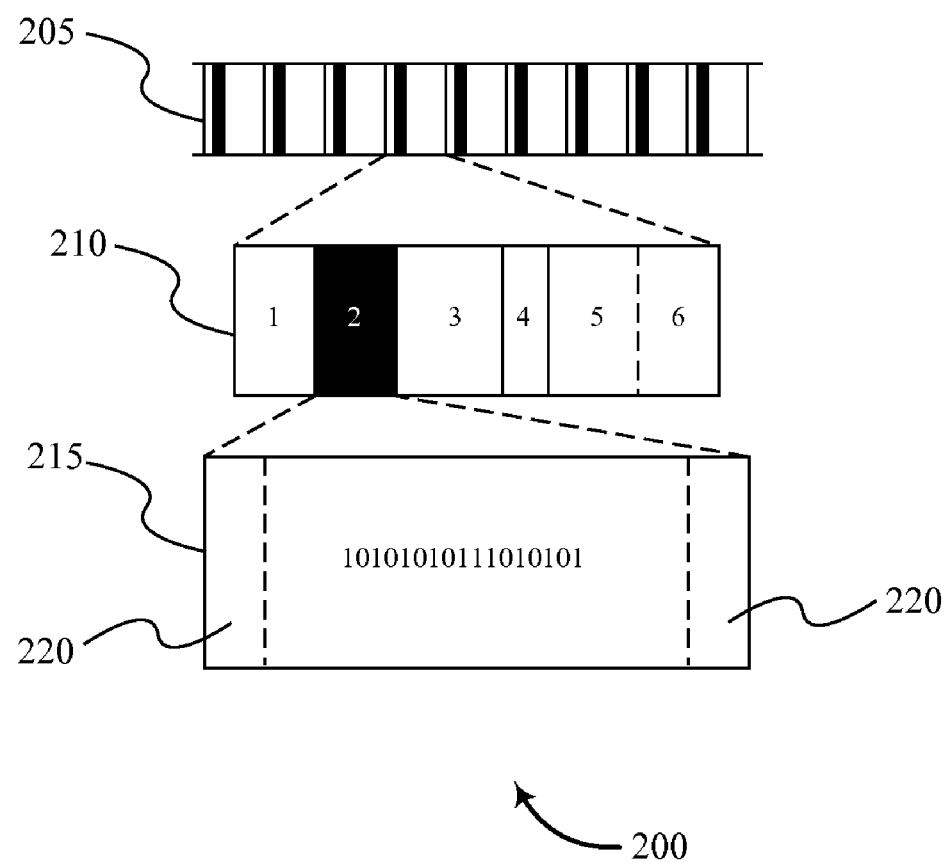
FIG. 2 shows a diagram of channel sharing using time division multiple access protocols according to some embodiments.

FIG. 2 shows a diagram 200 representing frames and timeslots in a TDMA system according to some embodiments. Data stream 205 can be divided into a number of frames 210. Each frame 210 can further be divided into timeslots 215. In a system with many users accessing the same channel, each user can transmit in rapid succession, one after the other, each using a previously defined timeslot 215. Timeslots 215 and/or frames 210 can have a fixed length and/or a variable length. Moreover, each time frame 210 and/or slot 215 can have a different size or the same size. As shown in FIG. 2 each frame 210 is divided into 6 timeslots 215. In some embodiments each user is assigned a specific timeslot 215 in which to communicate. In some embodiments, the same user can be assigned multiple timeslots 215. In some embodiments, each timeslot can be subdivided into multiple frequencies (e.g., using MFTDMA), allowing the same or different users to communicate on different frequencies within each timeslot 215.

TDMA methods can allow multiple stations to share the same transmission medium (e.g. radio frequency channel) while using only a part of the channel capacity. In dynamic TDMA, a scheduling algorithm can be used to dynamically reserve timeslots in each frame to variable bit-rate data streams, based on the traffic demand of each data stream. In multi-frequency TDMA, various frequency channels can be utilized during a single timeslot. In some embodiments, the same terminal or different terminals can use more than one frequency channel during a single timeslot to communicate.

In a system with multiple terminals, a burst time plan (BTP) can be used to specify which timeslot(s) a specific terminal can use to communicate with the hub (e.g., gateway 115 in FIG. 1). In embodiments employing frequency multiplexing, the BTP can also specify the frequency band a terminal can use to communicate. In some embodiments, a BTP can specify that a single terminal can communicate using multiple frequency bands within a single timeslot. Moreover, the timeslots can have fixed or variable lengths. The BTP can also establish global timing parameters that can be used to synchronize timing between the hub and terminals. In some embodiments, the BTP can indicate changes to a terminal symbol rate and/or changes to the transmission power used at the terminal.

Figure 3:
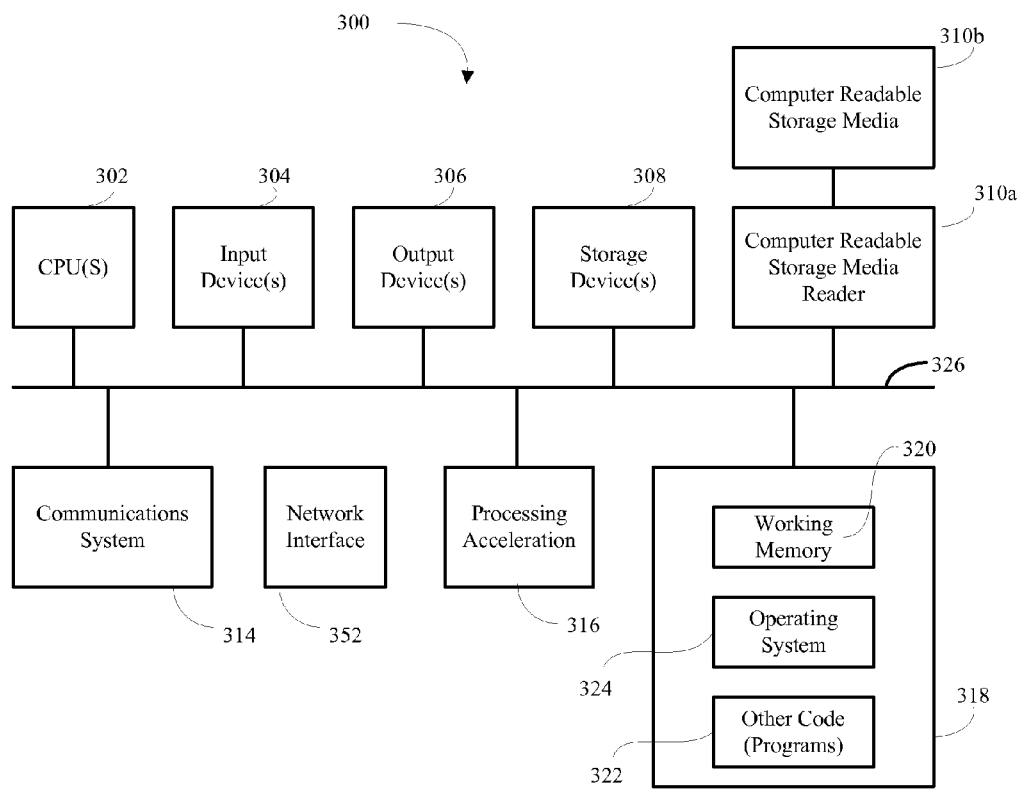
FIG. 3 shows a simplified block diagram of a computation system that can be employed in whole or in part at a gateway and/or a terminal according to some embodiments.

FIG. 3 shows a simplified block diagram of a computation system 300 that can be employed in whole or in part at a gateway 115 and/or a terminal 130 according to some embodiments. Computer system 300 can be used to perform any or all the methods shown in FIG. 4, FIG. 5, and/or FIG. 6. The drawing illustrates how individual system elements can be implemented in a separated or more integrated manner. The computation system 300 is shown having hardware elements that are electrically coupled via bus 326. Network interface 352 can communicatively couple the computational device 300 with another computer, for example, through network 120 such as the Internet. The hardware elements can include a processor 302, an input device 304, an output device 306, a storage device 308, a computer-readable storage media reader 310a, a communications system 314, a processing acceleration unit 316 such as a DSP or special-purpose processor, and memory 318. In some embodiments, communications system 314 can be communicatively coupled with satellite dish 110 or antenna 127. The computer-readable storage media reader 310a can be further connected to a computer-readable storage medium 310b, the combination comprehensively representing remote, local, fixed, and/or removable storage devices plus storage media for temporarily and/or more permanently containing computer-readable information.

The computer system 300 also comprises software elements, shown as being currently located within working memory 320, including an operating system 324 and other code 322, such as a program designed to implement methods and/or processes described herein. In some embodiments, other code 322 can include software that provides instructions for receiving user input from a dual polarization radar system and manipulating the data according to various embodiments disclosed herein. In some embodiments, other code 322 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

Figure 4:
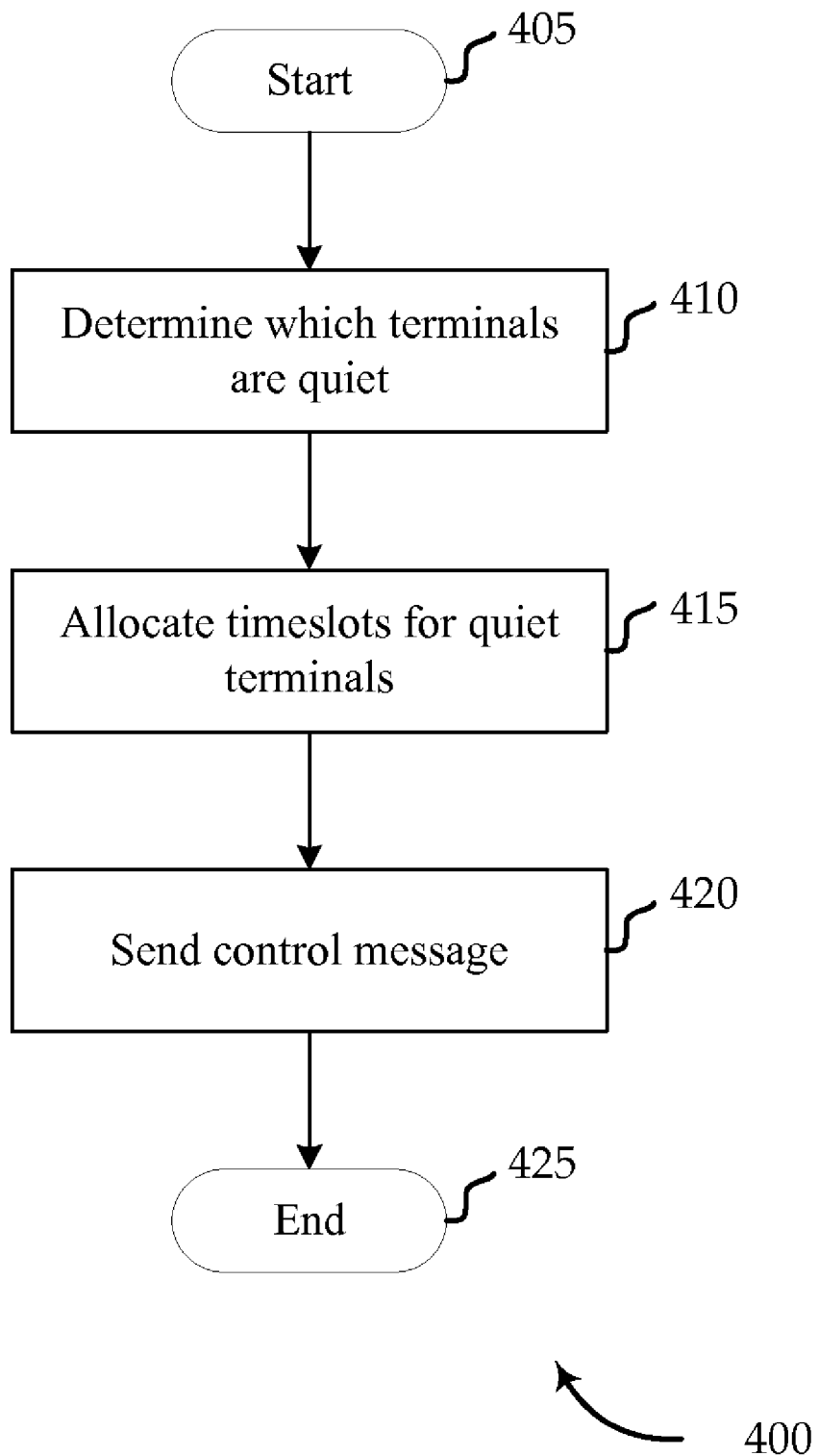
FIG. 4 shows a flowchart of a method for scheduling dummy bursts according to some embodiments.

FIG. 4 shows a flowchart of method 400 for allocating timeslots for dummy bursts according to some embodiments. Method 400 starts at block 405. At block 410 a hub can determine which terminals are quiet. For example, if a hub has not received data or signals from a terminal after a set time period, then the terminal is considered quiet. In other embodiments, a terminal can be considered quiet if it has not requested timeslots from hub, yet is still sending synchronization data to the hub. In some embodiments, the set time period for considering whether a terminal is quiet can be about 500 milliseconds, 1 minute, 5 minutes, 10 minutes, 15 minutes, etc. In some embodiments, when a terminal is determined to be quiet, the terminal is not scheduled to communicate data to the hub.

At block 415 the hub can allocate timeslots for quiet terminals. In some embodiments, the hub can also assign timeslots in different carrier frequencies in an MFTDMA system. Such timeslots can be allocated and specified in a burst time plan. A unique timeslot can be allocated for each quiet terminal in the burst time plan. Moreover, a single terminal can have multiple timeslots allocated. The burst time plan can be sent to the terminals at block 420, and method 400 ends at block 425.

Figure 5:
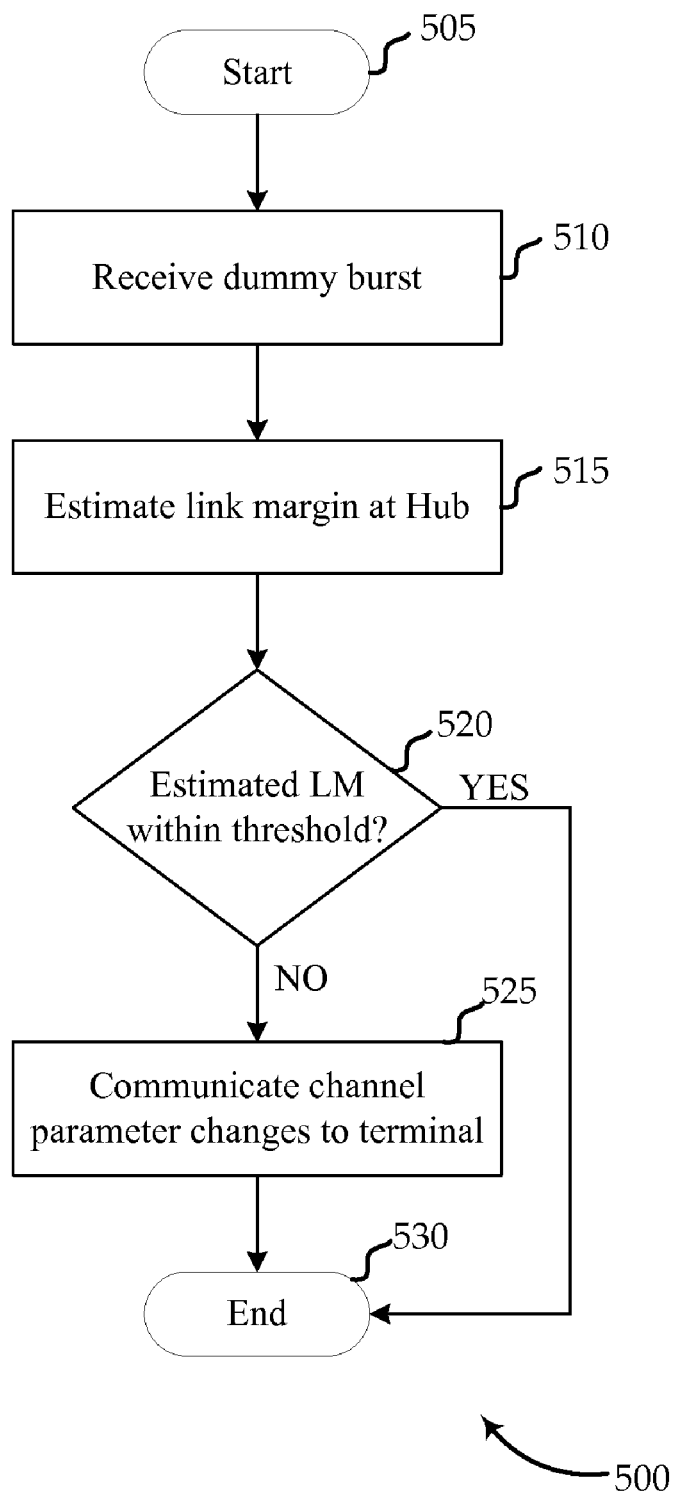
FIG. 5 shows a flowchart of a method for monitoring fading of terminal communications according to some embodiments.

FIG. 5 shows a flowchart of method 500 for receiving and processing dummy bursts from a terminal according to some embodiments. Once timeslots have been allocated to quiet terminals as described in FIG. 4, the terminals can send dummy bursts to the hub during the allocated timeslots. In some embodiments, the terminals can determine whether to send dummy bursts or not. In other embodiments, the allocation of a timeslot for a quiet terminal can indicate a request for a dummy burst from the hub. The terminals can, therefore, send a dummy burst as requested by the hub.

Method 500 starts at block 505. At block 510 dummy bursts are received from one or more quiet terminals during timeslots specified in the burst time plan. In particular, method 500 can apply to receiving a dummy burst from a single terminal and can be repeated for each terminal. The link margin of the received dummy burst can be measured at block 515. The link margin can be estimated by subtracting the typical $E_s/N_o$ (energy per symbol per noise power spectral density) from the estimated $E_s/N_o$. In other embodiments, different channel and/or signal characteristics can be estimated or determined and used to modify channel characteristics such as the received power, estimated channel BER (for example, as reported by the decoder based on flipped bits), or any other metrics that reflects signal quality. The typical $E_s/N_o$ can be a function of modulation, code rate, and burst type.

At block 520 the LM can be compared with a high threshold value and a low threshold value. If the measured LM is within the low threshold value and the high threshold value then the channel can be considered to be stationary and method 500 ends at block 530. However, if the measured LM is below the low threshold value then the channel can be considered to be degrading due to channel fading. At block 525, the hub can specify changes to communication parameters at the terminal to improve the transmission reliability and to mitigate the effects of fading, for example, in a subsequent burst time plan or other control messages. In some embodiments, the hub can notify the terminal that the channel is degrading (e.g., using a subsequent burst time plan or other control messages) and the terminal can make changes to communication parameters. However, if the measured LM is above the high threshold value then the channel can be considered to be improving. At block 525, the hub can specify changes to communication parameters used at the terminal to improve the transmission efficiency, for example, in a subsequent burst time plan or other control messages. In some embodiments, the hub can simply notify the terminal that the channel is improving, for example, using a subsequent burst time plan or other control messages, and the terminal can make changes to communication parameters.

In some embodiments, the terminal can change the transmission power. By increasing the transmission power of the signal, the terminal can combat the effects of channel degradation as detected at the hub. For example, if atmospheric conditions such as rain cause fading of signals from the terminal, increasing the transmission power can mitigate fading effects of the atmosphere. In some embodiments, an incremental transmission power increase can occur at the terminal. For example, the hub can specify an increase in the terminal's transmission power of about −13 dB, −10 dB, −8.2 dB, −6 dB, −5 dB, −4 dB, −3 dB, −2 dB, −1.5 dB, −1 dB, −0.75 dB, −0.5 dB, −0.25 dB, 0 dB, 1.7 dB, 3 dB, etc.

In some embodiments, the terminal can change the symbol rate, modulation, and/or code rate. Signals with higher symbol rates, higher code rates, and/or higher order modulation can be less robust to the effects of fading; by lowering the symbol rate, lowering the code rate, or lowering the order of modulation of the signal, the channel LM can be increased, and vice-versa. For example, if the terminal is using 16-QAM the hub can specify that the terminal change to 8-PSK or based on the information provided by the hub the terminal can determine that a change to 8-PSK can be beneficial to combat the effects of fading. In other embodiments, the symbol rate, code rate and the order of modulation format can be increased when the channel improves.

In some embodiments, the terminal can make a change in the carrier frequency of the signal in response to an estimated LM that is outside of threshold. In some embodiments, the burst time plan not only specifies timeslots for a terminal to communicate, the burst time plan can also specify a change to the carrier frequency. Fading can be depend on frequency such that different frequencies can suffer greater or lesser effects of fading. Moreover, in some cases, some frequencies can suffer from selective fading. As such, when the hub detects the effects of fading in a dummy burst, the hub can specify a change to the carrier frequency being used by the terminal. For example, the carrier frequency used can be a frequency within the allowed bandwidth of the MF-TDMA system.

Figure 6:
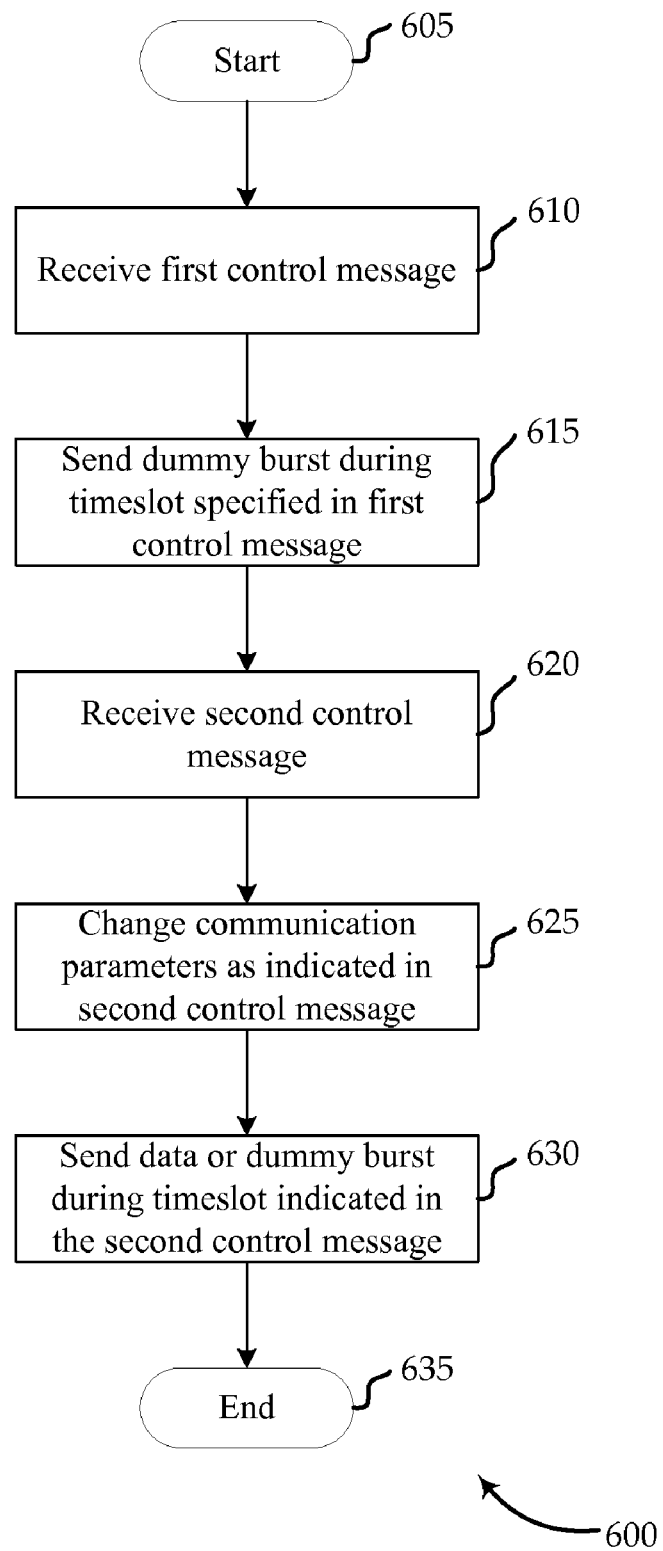
FIG. 6 shows a flowchart of a method for sending dummy bursts according to some embodiments.

FIG. 6 shows a flowchart of a method 600 for sending dummy bursts from a terminal in response to a timeslot allocation according to some embodiments. Method 600 starts at block 605. At block 610 the terminal can receive a burst time plan from the hub that either indicates a request to send a dummy burst during an allocated timeslot or indicates an allocated timeslot that can be used to send a dummy burst. The burst time plan can also indicate a carrier frequency that the terminal should use when transmitting a dummy burst. The burst time plan, in some embodiments, can also specify other transmission parameters such as symbol rate, transmission power, modulation format, code rate, the data type to be transmitted, etc. Such parameters can also be communicated from the hub to the terminal through other control messages. At block 615 a dummy burst can be transmitted during the timeslot and carrier frequency indicated in the burst time plan.

The dummy burst transmitted at block 615 can be received at the hub and the LM can be estimated by the hub. The hub can determine whether the LM is within threshold (e.g., as described with reference to block 520 of FIG. 5). If the LM is not within the threshold values, then the hub can send an indication back to the terminal to make changes in some communication parameters to adapt to the channel characteristics. For example, the hub can specify these changes in a second burst time plan or other control messages, which can be received at the terminal at block 620.

In some embodiments, the communication parameters indicated by the hub or determined by the terminal can be changed at block 625. Such parameters, for example, can include transmission power, carrier frequency, symbol rate code rate and/or modulation format amongst others. At block 630 once the terminal makes adjusts the communication, the terminal can send data and/or a dummy burst with the changed communication parameters. For example, if data is being queued for transmission, then the data can be sent as part of the dummy burst or the data can be scheduled as indicated in the burst time plan and sent.

Dynamic Link Adaptation

Dynamic link adaptation can be used in communication networks, for example, satellite system 100 described in relation to FIG. 1, to improve the return link (terminals to hub) transmission reliability and efficiency in fading environment. In additional to the transmit power, FEC rate, modulation and symbol rate for each terminal (or a group of terminals) based on link conditions as measured by the hub. When link conditions improve, less transmission power, higher FEC code rate, higher order modulation or higher symbol rate can be used to improve transmission efficiency (e.g., to save power and/or increase data throughput). When link conditions degrade, higher transmission power, lower FEC code rate, lower order modulation or lower symbol rate can be used to improve transmission reliability.

When a terminal is continuously sending traffic bursts to the hub, the link condition can be monitored at the hub by estimating the signal quality of the received traffic bursts. A current link margin can be calculated and updated in real time. Decisions can be made at the hub by comparing the current link margin to the target link margin. From this comparison, communication parameters, for example, transmit power, FEC rate, modulation and symbol rate, can be changed to either allow more reliable or more efficient transmission.

However in some systems, when a terminals has no traffic bursts to send, the link condition can no longer be monitored since there's no received burst at the hub and the communication parameters can no longer be updated in real time according the latest channel condition. In such a case, when the terminal restarts to transmit data, the communication parameters can be outdated (e.g., not with current link conditions) causing unreliable transmission or inefficient transmission. Thus, in some embodiments, DLA and power control can operate using dummy bursts to close this loop in DLA and power control.

Figure 7:
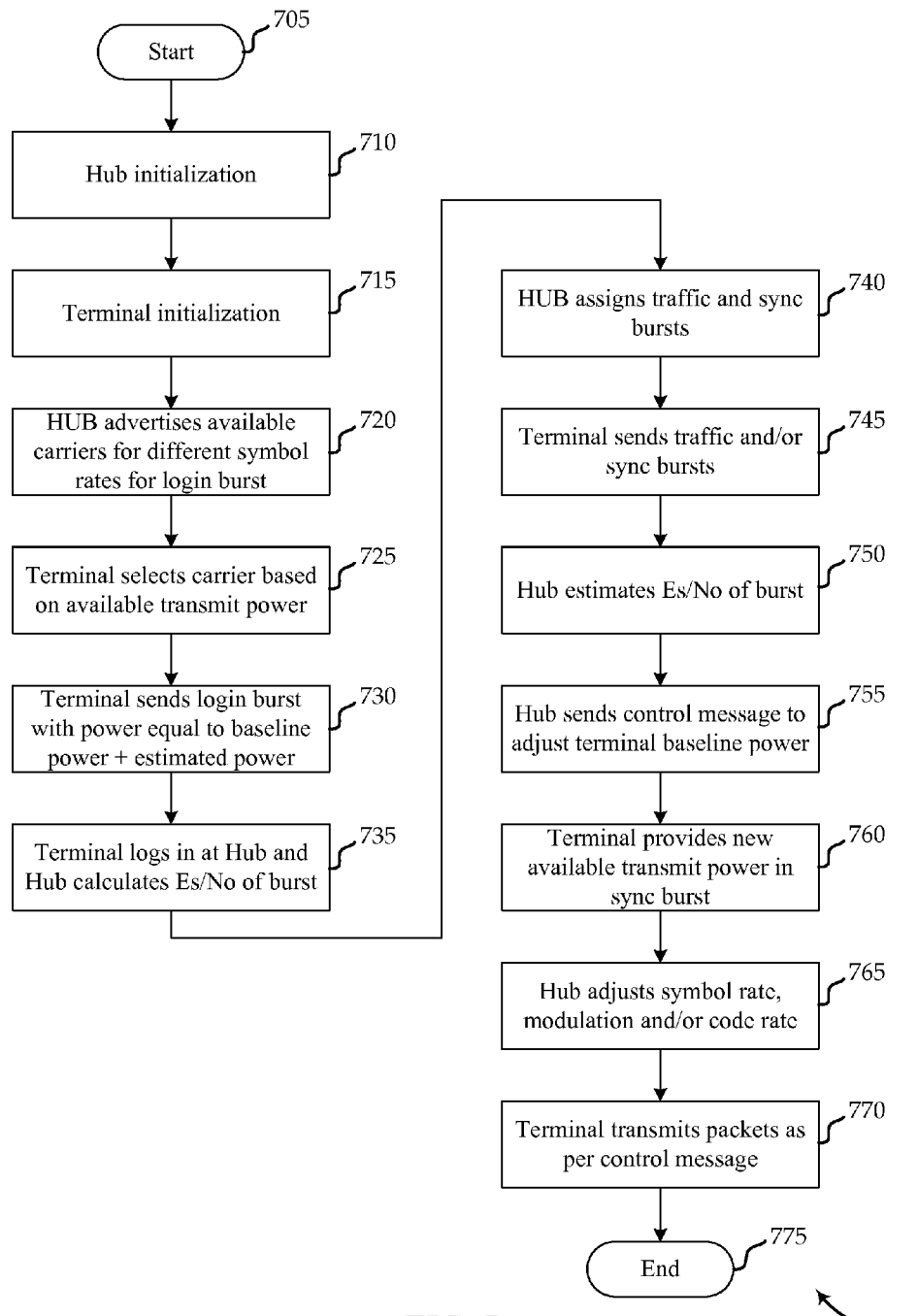
FIG. 7 shows a flowchart of a method for initializing communication between a terminal and a hub using some embodiments described herein.

FIG. 7 shows flowchart of a method 700 for initializing communication between a terminal and a hub using embodiments of DLA. While method 700 is described in conjunction with a single channel, method 700 can be expanded for use with a group of terminals either singularly or as a group. Method 700 begins at block 705. Hub initialization can occur at block 710. During initialization various parameters can be set. In some embodiments, the target link margin, high threshold, and/or low threshold can be set.

At block 715, the terminal can be initialized. In some embodiments, the terminal start-up baseline power and/or the maximum allowable power can be set. The maximum allowable power can be set to prevent satellite and/or block up converter saturation. The maximum allowed power can be set based on hardware limitation and/or specifications.

At block 720, the hub can advertise a timeslot listing for the available carrier channels and their associated symbol rates for terminals to send a first burst to attempt log in. Any number of channels can be utilized with an associated symbol rate. For example, the available channels can include a 128 ksps carrier, a 512 ksps carrier, a 1024 ksps carrier, a 2048 ksps carrier, a 4096 ksps carrier, and/or a 8192 ksps carrier. Each of these carriers can implement various different symbol rates, modulation and/or code rates. Various other carriers with specified symbol rates can be used without limitation. In some embodiments, multiple carriers with the same symbol rate can be used.

The terminal can then select one of the carrier channels within which to send a burst that can log into the hub based on the terminal's available transmit power at block 725. In some embodiments, the available transmit power can be determined/estimated from difference between the maximum allowed power and the terminal baseline power. In some embodiments, the terminal baseline power can correspond to the terminal transmit power of a burst with lowest code rate, lowest modulation order and lowest symbol rate. The terminal baseline power can be initialized in block 715. During initialization a conservative baseline power can be selected that allows for the terminal to log into the hub in a worst case scenario. Using the available transmit power, the terminal can determine which of the available carrier channels can be used.

For example, the terminal can reference a lookup table that includes typical estimated power or Es/No for each available carrier as a function of burst type, modulation and/or code rate. The terminal can select any channel that permits use with the available transmit power. If there are more than one possible carrier channels, in some embodiments, the terminal can select a channel randomly or by using the highest bit speed.

The terminal can then send a burst, for example, a sync, dummy, or control burst, with the baseline power plus the typical estimated power (e.g., as found in a look up table) at block 730. In some embodiments, the burst can also report the available transmit power. At block 735, the burst can be received and the Es/No can be estimated at the hub. At this point the terminal can successfully log into the hub (or the network coupled with the hub). The Hub can then assign time slots for sync and/or traffic bursts to the terminal(s) at block 740. In some embodiments, no power correction has been sent to the terminal yet.

At block 745 the terminal can begin sending traffic and/or synch bursts at block 745. For example, traffic and/or sync bursts can still communicate the original power and link settings. At block 750, the hub can estimate Es/No of the traffic, dummy, and/or sync burst and the link margin can be calculated.

The hub can then send a command message to the terminal to adjust the baseline power of the terminal at block 755. For example, the hub can command the terminal to lower the baseline power −10 dB. Thus, future sync, dummy or traffic bursts can be sent with the lower power. The terminal can then provide feed back with the new available transmit power at block 760.

At block 765, the hub can select a new carrier channel with a different modulation and/or code rate based on the available transmit power at the terminal. The hub can then send a control message (e.g., BTP) commanding the terminal to switch to the new carrier channel and use a different modulation and/or code rate. The terminal can then transmit traffic and/or sync bursts with the new carrier channel at block 770 prior to ending at block 775.

Figure 8:
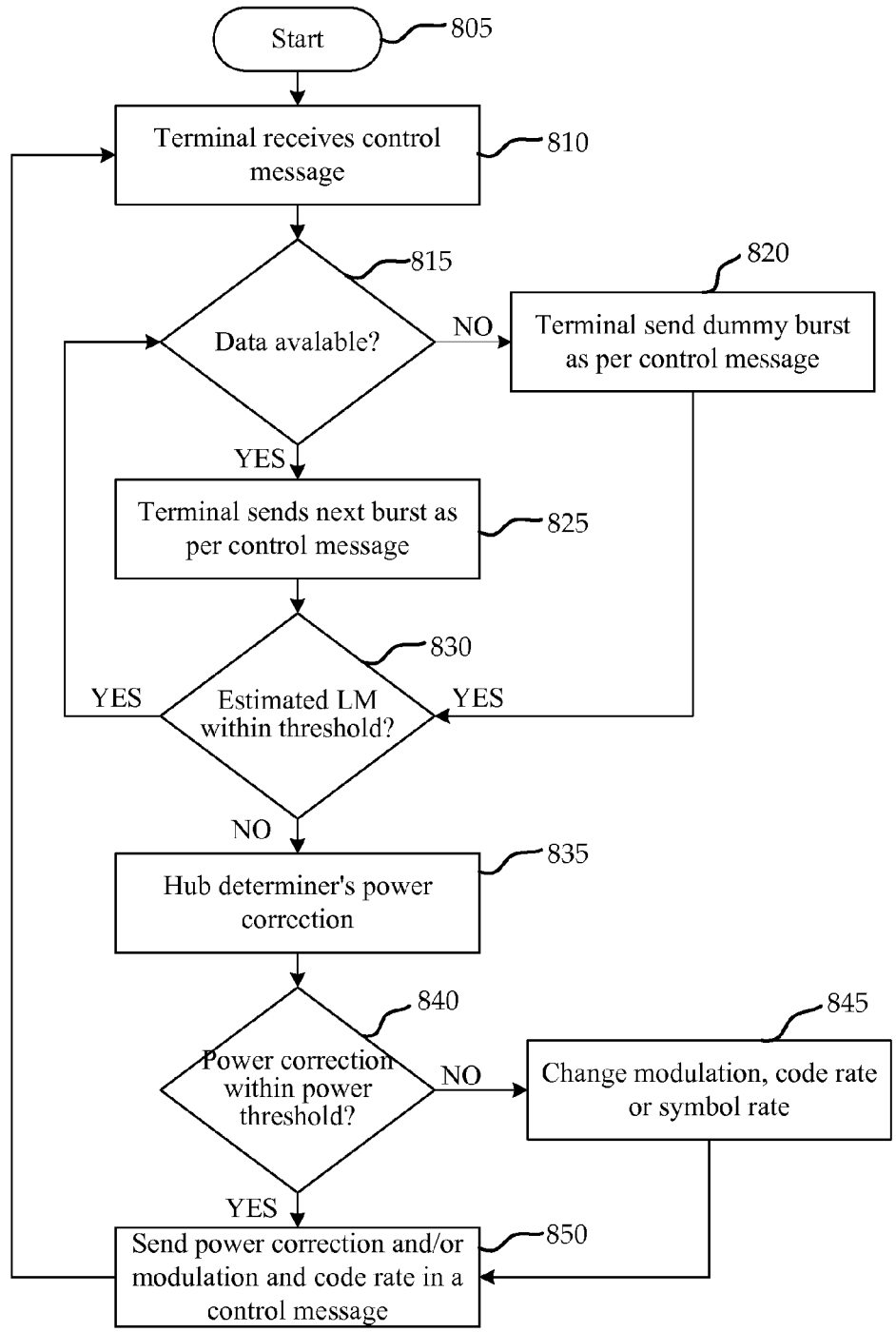
FIG. 8 shows a flowchart of a method for providing dynamic link adaptation according to some embodiments.

FIG. 8 shows a flowchart of a method 800 for providing dynamic link adaptation according to some embodiments. Method 800 can start at block 805. In some embodiments, block 805 can continue from block 770 of FIG. 7. Generally, method 800 can dynamically adapt the power, modulation, and/or code rate of signals transmitted from a terminal to a hub in response to fading effects. At block 810, the terminal can receive a control message from a hub that can include power adjustments, changes to a carrier channel, changes to modulation, and/or changes to code rate. In some embodiments, if data is available for transmission as determined at block 815, then the next traffic burst can be transmitted at block 825. In some embodiments, if traffic is not available at block 815, then a dummy burst can be transmitted at block 820.

The hub can receive the traffic burst or the dummy burst and the Es/No of the burst can be determined. From the estimated Es/No of the burst, an estimate link margin can be determined by calculating the difference between the estimated Es/No of the burst and the typical Es/No associated with a modulation and code rate. If the link margin is found to be within a high threshold value and a low threshold value surrounding a target link margin, at block 830, then no DLA changes or power correction are needed and method 800 can return to block 815. In returning to block 815, various control and/or sync messages can be transmitted to the terminal.

At block 835, the hub can determine a power correction for the terminal, for example, to increase the baseline power of the terminal. The hub and/or the terminal can check to see if the power correction pushes the power above the maximum allowable power at block 840, for example, as initialized in block 810. If the power correction does not push the power above the maximum allowable power, then the hub can send a control message to the terminal to address the power with the power correction at block 850, and method 800 can return to block 815. If the power correction would push the power above the maximum allowable power, then hub can determine a change to carrier channel/symbol rate and/or a change to the modulation, code rate, and/or symbol rate at block 845 and send the corrections at block 850. Of course, method 800 can extend to embodiments that require a decrease in power at the terminal or a higher symbol rate, higher order modulation and/or code rate, for example, when channel fading lessens.

In some embodiments of dynamic link adoption, if traffic or sync messages are not queued at the terminal, dummy bursts can be employed in their place. The use of dummy bursts can allow quiet terminals to operate with the proper power, using the proper carrier channel, modulation and/or code rate when it comes time to transfer data.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the satellite communication system and components are described herein with reference to particular blocks, these blocks are defined for convenience of description and are not intended to imply a particular physical arrangement of component parts. Further, the blocks need not correspond to physically distinct components.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A satellite communication method comprising:
   receiving signals at a hub from a plurality of terminals through a satellite, each of the signals being segmented into a plurality of timeslots;
   determining at the hub that a terminal within the plurality of terminals should transmit a dummy burst to the hub;
   at the hub, allocating capacity for the terminal to transmit a dummy burst;
   receiving a burst from the terminal within one of the plurality of timeslots, wherein the burst comprises the dummy burst if it is determined, at the terminal, that the terminal should transmit the dummy burst, or the burst comprises a traffic burst if it is determined, at the terminal, that the terminal should not transmit the dummy burst;
   estimating a received signal quality of the burst at the hub; and
   when the received signal quality is less than a first signal quality value, communicating an indication to the terminal to change at least one communication parameter.

2. The satellite communication method according to claim 1, further comprising when the received signal quality is greater than a second signal quality value, communicating an indication to the terminal to change at least one communication parameter.

3. The satellite communication method according to claim 1, wherein the received signals are segmented into one of a plurality of carrier frequencies.

4. The satellite communication method according to claim 1, wherein the signal quality is estimated by estimating the link margin of the signal.

5. The satellite communication method according to claim 4, wherein the link margin is calculated as the difference between the received signal quality and the expected signal quality.

6. The satellite communication method according to claim 1, wherein the received signal quality can be indicated by at least one of the group consisting of: the estimated power of the received signal, the estimated signal-to-noise ratio of the received signal, the estimated link margin of the received signal, the estimated decoded BER of the received signal, the estimated packet error rate (PER) of the received signal, and the estimated channel BER of the received signal.

7. The satellite communication method according to claim 1, wherein the at least one communication parameter includes two or more communication parameters selected from the group consisting of transmission power, modulation format, code rate, carrier frequency, and symbol rate of the burst.

8. The satellite communication method according to claim 1, wherein the at least one communication parameter is communicated from the hub to a terminal using a burst time plan.

9. The satellite communication method according to claim 1 further comprising sending a burst time plan from the hub to the terminal, wherein the burst time plan includes an indication specifying a timeslot within which the burst should be sent.

10. The satellite communication method according to claim 1 further comprising sending a burst time plan from the hub to the terminal, wherein the burst time plan includes an indication specifying a carrier frequency within which the burst should be sent.

11. The satellite communication method according to claim 1, wherein the dummy burst includes data selected from the group consisting of: random data, system data, terminal diagnostic data, network data, and communication data.

12. A satellite communication method comprising:
    receiving a control message at a terminal from a hub through a satellite, the control message allocating capacity for the terminal to transmit a dummy burst;
    determining, at the terminal, whether to transmit the dummy burst to the hub;
    transmitting a burst to the hub through the satellite during a timeslot specified by the control message, wherein the burst includes the dummy burst if it is determined, at the terminal, to transmit the dummy burst, or the burst includes a traffic burst if it is determined, at the terminal, to not transmit the dummy burst;
    receiving a second control message at the terminal from the hub through the satellite, the second control message including information indicating changes to at least one communication parameter selected from the group consisting of: transmission power, carrier frequency, modulation, code rate, and symbol rate; and
    communicating with the hub using changes to the at least one communication parameter indicated in the second control message.

13. The satellite communication method according to claim 12, wherein the burst is transmitted using a carrier frequency specified by the control message.

14. A satellite communication hub comprising:
a satellite dish configured to transmit signals to, and receive signals from, one or more terminals through one or more satellites;
a controller coupled with the satellite dish, the controller being configured to:
estimate signal quality of traffic, control, and dummy burst(s) received at the satellite dish from the one or more terminals;
determine which of the one or more terminals should send a dummy burst;
allocate capacity for the one of the one or more terminals to transmit the dummy burst; and
when the estimated signal quality is less than a first threshold signal quality value, communicate an indication to the one of the one or more terminals to change at least one communication parameter.

15. The satellite communication hub according to claim 14, wherein the controller is configured to communicate an indication to the one of the one or more terminals to change at least one communication parameter when the estimated signal quality is higher than a second threshold signal quality value.

16. The satellite communication hub according to claim 14, wherein the controller is configured to estimate the signal quality by estimating at least one of the group consisting of: the estimated power of the received signal, the estimated signal-to-noise ratio of the received signal, the estimated link margin of the received signal, the estimated decoded BER of the received signal, the estimated packet error rate (PER) of the received signal, and the estimated channel BER of the received signal.

17. The satellite communication hub according to claim 16, wherein the link margin is calculated as the difference between the received signal quality and the expected signal quality.

18. The satellite communication hub according to claim 14, wherein communicating the indication to the one of the one or more terminals to change at least one communication parameter includes communicating the at least one communication parameter as part of a control message.

19. The satellite communication hub according to claim 14 further comprising communicating a control message using the satellite dish, wherein the control message indicates a timeslot within which the one of the one or more terminals should send the dummy burst.

20. The satellite communication hub according to claim 14 further comprising communicating a control message using the satellite dish, wherein the control message indicates a carrier frequency within which the one of the one or more terminals should send the dummy burst.

21. The satellite communication hub according to claim 14, wherein the at least one communication parameter includes two or more communication parameters selected from the group consisting of: transmission power, modulation, code rate, carrier frequency, and symbol rate.

22. A satellite communication terminal comprising:
a satellite antenna configured to transmit signals to and receive signals from a hub through one or more satellites;
a controller coupled with the satellite antenna, the controller being configured to:
receive a first control message from the hub using the satellite antenna, the control message allocating capacity for the terminal to transmit a dummy burst;
determine whether to transmit the dummy burst to the hub;
transmit at least one burst to the hub using the satellite antenna, wherein the at least one burst comprises either or both the dummy burst and a traffic burst, and the at least one burst is transmitted during at least one timeslot specified by the first control message, and the at least one burst is transmitted using a first set of communication parameters;
receive a second control message from the hub using the satellite antenna, the second control message including a second set of communication parameters, wherein at least one communication parameter in the second set of communication parameters is different from a corresponding communication parameter in the first set of communication parameters; and
thereinafter communicate with the hub using the second set of communication parameters.

23. The satellite communication terminal according to claim 22, wherein the communication parameters include parameters selected from the group consisting of: transmission power, carrier frequency, modulation, code rate, and symbol rate.

24. The satellite communication terminal according to claim 22, wherein the control message comprises a burst time plan.

25. A satellite communication hub comprising:
first processing means for determining which terminals of one or more terminals should transmit a dummy burst;
second processing means for allocating capacity for the terminals to transmit the dummy burst;
reception means for receiving signals from the one or more terminals through one or more satellites, wherein the signals include a received burst from at least one of the one or more terminals;
third processing means for determining whether the link margin estimated from the received burst is below a first threshold; and
transmission means for transmitting an indication to the terminal to change at least one communication parameter when the link margin is below the first threshold.

26. The satellite communication hub according to claim 25, wherein the transmission means transmits an indication to the terminal to change at least one communication parameter when the link margin is above a second threshold.

27. The satellite communication hub according to claim 25, wherein the transmission means transmits a burst time plan that includes the indication to change at least one communication parameter.

28. The satellite communication hub according to claim 25, wherein the transmission means transmits a burst time plan that specifies either or both a timeslot or a carrier frequency within which a terminal should send a dummy burst.

29. A satellite communication terminal comprising:
receiving means for receiving a first control message from a hub and a second control message from the hub, wherein the first control message allocates a timeslot within which a first burst should be transmitted to the hub and indicating a first set of communication parameters, and wherein the second control message allocates a timeslot within which a second burst should be transmitted to the hub and indicating a second set of communication parameters;
processing means for:
determining whether to transmit a first dummy burst to the hub, based on the first control message; and
determining whether to transmit a second dummy burst to the hub, based on the second control message; and transmitting means for sending the first burst to the hub as specified by the first control message using a first set of communication parameters, and for sending the second burst as specified by the second control message using the second set of communication parameters, wherein the first burst comprises the first dummy burst if the processing means determined to transmit the first dummy burst, and the second burst comprises the second dummy burst if the processing means determined to transmit the second dummy burst, and wherein the value of at least one parameter in the first set of communication parameters differs from the value of a corresponding parameter in the second set of communication parameters.

30. The satellite communication terminal according to claim 29, wherein the burst comprises either a dummy burst or a traffic burst.

31. The satellite communication terminal according to claim 29, wherein the receiving means includes an antenna.

32. The satellite communication terminal according to claim 29, wherein the transmitting means includes an antenna.

33. A satellite communication method comprising:
determining at a hub that a terminal should transmit a dummy burst to the hub through a satellite;
at the hub, allocating capacity for the terminal to transmit a dummy burst;
receiving a burst at the hub from the terminal through the satellite, wherein the burst comprises the dummy burst if it is determined that the terminal should transmit the dummy burst;
estimating the link margin of the burst;
when the link margin is not within threshold values, then:
determining a power correction for the terminal;
determining whether the power correction would result in a transmit power at the terminal that is within the power threshold values; and
when the power correction is within the power threshold values, sending the power correction to the terminal; and
when the power correction is not within the power threshold values, sending the power correction to the terminal along with changes to either or both of the modulation and code rate.

34. The satellite communication method according to claim 33, wherein the burst comprises a traffic burst if it is determined, at the terminal, that the terminal should not transmit the dummy burst.

35. The satellite communication method according to claim 33, wherein when the power correction is not within the power threshold values, sending the power correction to the terminal along with changes to the symbol rate.

36. The satellite communication method according to claim 1, wherein the at least one communication parameter is communicated from the hub to a terminal using a control message.

37. The satellite communication method according to claim 1, wherein determining that a terminal should transmit a dummy burst comprises determining that the terminal is quiet for a predetermined amount of time.

38. The satellite communication method according to claim 12, wherein determining whether to transmit a dummy burst comprises determining whether the terminal is quiet for a predetermined amount of time.

* * * * *